Feb. 3, 1931.  I. A. WEAVER  1,790,851
BRAKE PEDAL ACTUATOR
Filed Sept. 6, 1927
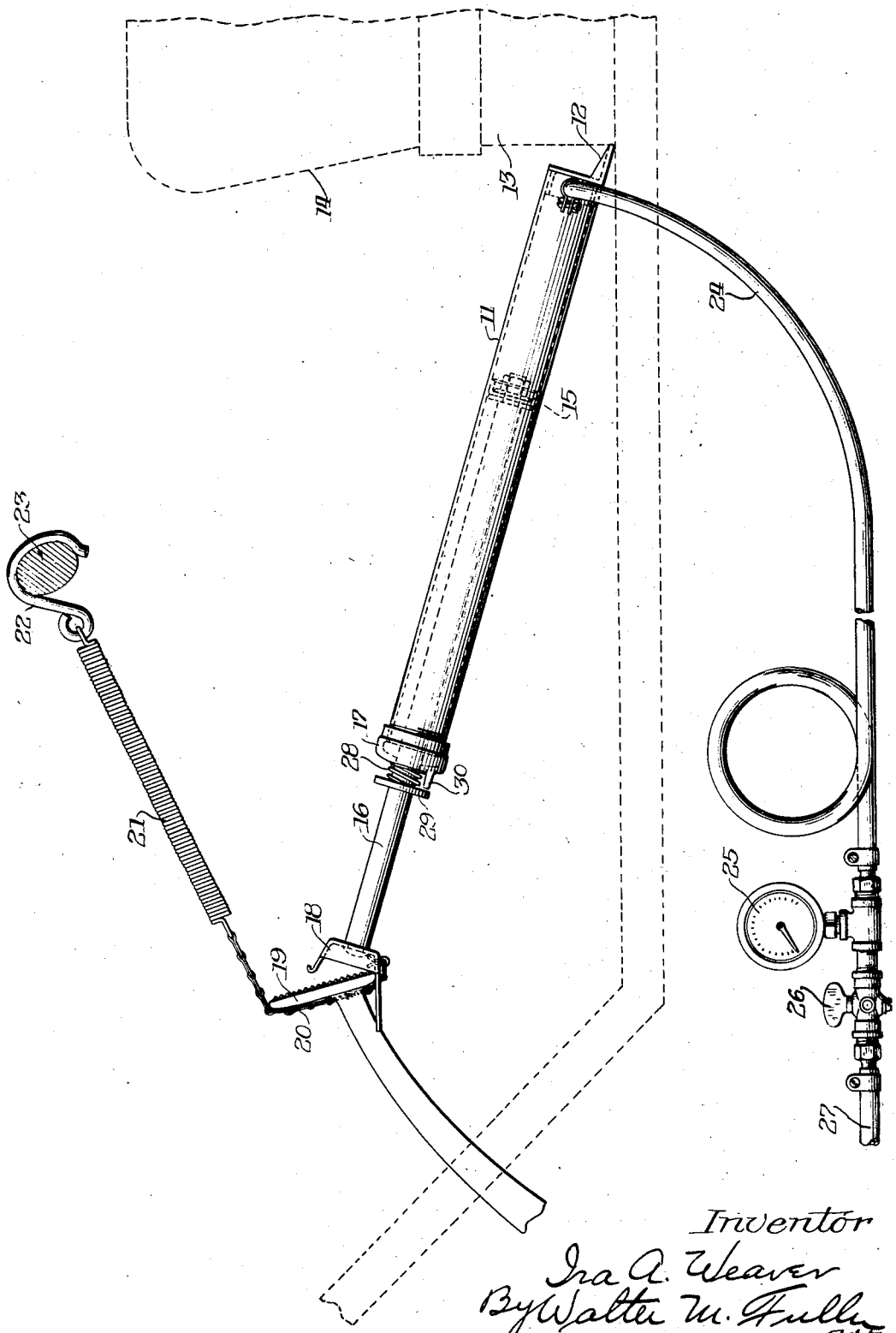
Inventor
Ira A. Weaver
By Walter M. Fuller
Atty.

Patented Feb. 3, 1931

1,790,851

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

BRAKE-PEDAL ACTUATOR

Application filed September 6, 1927. Serial No. 217,667.

The present invention relates to appliances for operating the pedals of automobiles, brake or clutch, or similar members with the controlling means for the actuation of the apparatus at a distance, possibly under or to the rear of the car, so that the workman, without an assistant, may work the pedal while observing the action of or at the time of making adjustments of the brake mechanism. In other words, one of the leading aims of the invention is the provision or production of a device of this character operable at a distance, effective in use, composed of a few and simple parts, and economical to manufacture.

To enable those skilled in this art to have a full and complete understanding of the invention and its several structural and functional advantages, in the accompanying drawing, forming a part of this specification, I have illustrated a present, desirable, and preferred embodiment of the invention.

Referring to this drawing, it will be observed that the novel means for operating the brake-pedal comprises a relatively-long cylinder 11 fitted at one end with a closure supplied with a rib or prong 12 designed to bear against the front face of the base 13 for the front-seat cushion 14 of the vehicle, the cylinder accommodating a sliding piston or plunger 15 therein, on a piston-rod 16 extending out through a centrally-apertured cap 17, the rod at its protruding end carrying a bracket 18 designed and formed to appropriately engage both below and above the brake-pedal 19 of the automobile.

Such element 18 has one end of a chain or other flexible member 20 secured thereto, the opposite end being fastened to an end of a coiled contractile spring 21 supplied at its other end with a hook or attachment member 22 intended to extend over a portion of the steering-wheel rim 23 of the vehicle.

As is indicated, the lower part of the cylinder is connected by a hose 24 of suitable length to a pressure-gauge 25 and a two-way valve 26 which in turn is joined to a compressed-air hose or pipe 27.

A short, coiled spring 28, around the piston-rod 16, bears against the outer face of cap 17 and presses against the adjacent surface of an apertured lock disc or washer 29, the spring normally holding or maintaining the member 29 at right angles to the axis of the piston-rod, so that the latter may slide freely through the central hole of the former.

Cap 17 has a lug 30 extended toward and almost touching the locking or holding disc.

When it is desired to keep the pedal depressed, after having been forced down by the travel of the piston and its rod, the operator pushes to the right on the upper part of the disc, thereby slightly inclining it to the axis of the rod, the lower portion of the disc being held from substantial movement in the same direction by engagement or contact with the abutment 30.

Thus the disc or washer becomes locked to the piston-rod, thereby preventing its inward movement in the cylinder and holding the pedal in the required position.

The new and improved apparatus is used substantially as follows:—

The device is applied to the vehicle in the manner illustrated with the foot 12 bearing against the wall 13, and, thereupon, the valve 26 is turned to admit compressed-air from the supply-conduit 27 in proper amount to force the piston, piston-rod, and element 18 outwardly until the latter properly fits on the brake-pedal.

The chain is then passed around the pedal, as depicted, and the member 22 is hooked over the steering-wheel.

While the operator is at a distance, for example, near the brake-mechanism to inspect its operation or to effect its adjustment, when it is desired to actuate the brakes, he turns the valve 26 to admit air under suitable pressure into the cylinder behind the piston which is forced forwardly thereby, pressing the piston-rod and the member 18 in the same direction, resulting in depressing the pedal, the device rocking down as the pedal descends and also elongating or straining the spring 21.

In case it is desired to lock the pedal in such lowered position, this may be accomplished by pressing the top of the disc 29 to the right, its lower part being prevented from substantial movement in that direction by engagement with the lug or abutment 30.

Such slightly oblique disposition of the washer to the piston-rod clutches the two together so that the rod cannot move in the direction of its correlated cylinder.

If the parts are not so locked together, the pedal may be worked up and down several times, to test the brake adjustment or to facilitate the working of lubricant adequately into the joints of the brake linkage, by properly turning the valve 26 to admit air alternately into the cylinder and to permit its discharge therefrom to the atmosphere.

If the pedal has been locked depressed as indicated above, of course it cannot rise to normal position until released by pressing disc 29 to the left to position it at right-angles to the axis of the piston-rod, in which relation of the elements the rod may slide freely through the disc or washer.

When the air is permitted to discharge from the cylinder, the piston and associated elements are automatically returned to normal or original position by the contraction of the previously lengthened or stretched spring 21 and hence the spring forming part of the brake mechanism is not relied upon solely for this purpose.

From the foregoing it will be apparent that owing to the range of adjustment of the appliance, it can be satisfactorily used in all automobiles of the customary dimensions.

The invention, as defined by the appended claims, is not necessarily limited and restricted to this precise embodiment, and many minor mechanical changes may be incorporated in the structure without departure from the heart and essence of the invention and without the sacrifice of any of its substantial benefits and advantages.

I claim:

1. In a brake-pedal operating device, the combination of a cylinder, a piston reciprocatory in said cylinder, a piston-rod on which said piston is mounted extending out of an end of said cylinder, a member on said piston-rod designed to engage the brake-pedal, a flexible means capable of elongation and contraction connected to said member and adapted to extend around the brake-pedal and to be attached to some part of the vehicle, and means to admit fluid under pressure into said cylinder on the side of said piston opposite said piston-rod to depress the pedal and to permit its discharge from said cylinder, the contraction of said means assisting in returning said piston to its initial position.

2. In a brake-pedal operating device, the combination of a cylinder, a piston reciprocatory in said cylinder, a piston-rod on which said piston is mounted extending out of an end of said cylinder, a member on said piston-rod designed to engage the brake-pedal, a flexible element connected to said member and adapted to extend around the brake-pedal, a coiled spring joined to said element, means to connect said spring to the steering mechanism of the vehicle, and means to admit fluid under pressure into said cylinder on the side of said piston opposite said piston-rod to depress the pedal and to permit its discharge from said cylinder, the contraction of said spring assisting in returning said piston to its initial position.

3. In a brake-pedal operating device, the combination of a cylinder, a piston reciprocatory in said cylinder, a piston-rod on which said piston is mounted extending out of said cylinder, a member on said piston-rod designed to engage the brake-pedal, a flexible element connected to said member and adapted to extend around the brake-pedal, a coiled spring joined to said element, means to connect said spring to the steering-wheel of the vehicle, means to admit compressed-air into said cylinder to move the piston therein to depress the brake-pedal and to permit the discharge of such air from the cylinder, the contraction of said spring assisting in the return of said piston to initial position, and means to lock said piston-rod in a plurality of extended positions.

4. In a brake-pedal operating device, the combination of a cylinder, a piston reciprocatory in said cylinder, a piston-rod on which said piston is mounted extending out of said cylinder, a member on said piston-rod designed to engage the brake-pedal, a flexible element connected to said member and adapted to extend around the brake-pedal, a coiled spring joined to said element, means to connect said spring to the steering-wheel of the vehicle, means to admit compressed-air into said cylinder to move the piston therein to depress the brake-pedal and to permit the discharge of such air from the cylinder, the contraction of said spring assisting in the return of said piston to initial position, and means to lock said piston-rod in extended positions, including an abutment on said cylinder, an apertured disc designed to engage said abutment and through which said piston-rod extends, and a spring between said disc and cylinder tending to maintain said disc at right-angles to the axis of the piston-rod.

5. In a pedal-actuator adapted to cooperate with the automatically-retracted pedal of an automobile, the combination of means designed to bear against an abutment, means adapted to engage the pedal, means to operate said pedal-engaging means to depress and to release the pedal, and automatically-acting means forming a part of said actuator and operating in conjunction with the usual automatically-restoring means forming a part of the pedal mechanism to maintain said engagement of said means and pedal constant and to assist in the return of the pedal to normal unoperated position when released.

6. In a pedal-actuator adapted to cooperate with the automatically-retracted pedal of an automobile, the combination of means designed to bear against an abutment, means adapted to engage the pedal, means to operate said pedal-engaging means to depress and to release the pedal, and automatically-acting spring means forming a part of said actuator and operating in conjunction with the usual automatically-restoring means forming a part of the pedal mechanism to maintain said engagement of said means and pedal constant and to assist in the return of the pedal to normal unoperated position when released.

In witness whereof I have hereunto set my hand.

IRA A. WEAVER.